United States Patent
Pousse et al.

(10) Patent No.: US 11,378,006 B2
(45) Date of Patent: Jul. 5, 2022

(54) DEVICE FOR TEMPORARILY INCREASING TURBOMACHINE POWER

(71) Applicant: SAFRAN HELICOPTER ENGINES, Bordes (FR)

(72) Inventors: Frédéric Pousse, Gan (FR); Lionel Napias, Sedze Maubecq (FR); Laurent Minel, Pau (FR); Bertrand Moine, Gan (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 381 days.

(21) Appl. No.: 16/498,273

(22) PCT Filed: Mar. 27, 2018

(86) PCT No.: PCT/FR2018/050747
§ 371 (c)(1),
(2) Date: Sep. 26, 2019

(87) PCT Pub. No.: WO2018/178565
PCT Pub. Date: Oct. 4, 2018

(65) Prior Publication Data
US 2021/0102491 A1 Apr. 8, 2021

(30) Foreign Application Priority Data

Mar. 27, 2017 (FR) ..................................... 1752506

(51) Int. Cl.
*F02C 3/30* (2006.01)
*B64D 35/08* (2006.01)
(Continued)

(52) U.S. Cl.
CPC .............. *F02C 3/305* (2013.01); *B64D 35/08* (2013.01); *F02C 6/02* (2013.01); *F02C 7/143* (2013.01);
(Continued)

(58) Field of Classification Search
CPC ... F02C 3/305; F02C 7/1435; F05D 2260/212
See application file for complete search history.

(56) References Cited

U.S. PATENT DOCUMENTS 3,434,281 A 3/1969 Donaldson
3,518,023 A 6/1970 Britten et al.
(Continued)

FOREIGN PATENT DOCUMENTS

CN 101027468 A 8/2007
CN 104956151 A 9/2015
(Continued)

OTHER PUBLICATIONS

International Search Report and Written Opinion in corresponding International Application No. PCT/FR2018/050747, dated Jul. 3, 2018. (13 pages).
(Continued)

*Primary Examiner* — Todd E Manahan
*Assistant Examiner* — David P. Olynick
(74) *Attorney, Agent, or Firm* — Bookoff McAndrews, PLLC.

(57) ABSTRACT

A device for temporarily increasing power in order to increase the power from at least one first turbine engine and from at least one second turbine engine, the device including a tank of coolant liquid, a first injection circuit connected to the tank and leading to at least one injection nozzle configured to be installed upstream from the first turbine engine, a second injection circuit connected to the tank and leading to at least one injection nozzle configured to be installed upstream from the second turbine engine, each of the first and second injection circuits including at least one first valve and at least one second valve arranged upstream from said at least one first valve, and a bridge pipe connecting together the first injection circuit and the second injection circuit upstream from their respective first valves and downstream from their respective second valves.

10 Claims, 2 Drawing Sheets

(51) Int. Cl.
*F02C 6/02* (2006.01)
*F02C 7/143* (2006.01)
*F02C 9/00* (2006.01)

(52) U.S. Cl.
CPC .............. *F02C 7/1435* (2013.01); *F02C 9/00* (2013.01); *F05D 2220/329* (2013.01); *F05D 2270/053* (2013.01); *F05D 2270/093* (2013.01)

(56) References Cited

U.S. PATENT DOCUMENTS

| | | | | |
|---|---|---|---|---|
| 2011/0138817 | A1* | 6/2011 | Vialle | F01D 25/22 60/775 |
| 2014/0373505 | A1* | 12/2014 | Dyrla | F02C 7/14 60/39.15 |
| 2015/0315965 | A1* | 11/2015 | Moine | F02C 3/305 60/775 |

FOREIGN PATENT DOCUMENTS

| | | | |
|---|---|---|---|
| EP | 2815965 | A1 | 12/2014 |
| FR | 3000137 | A1 | 6/2014 |

OTHER PUBLICATIONS

Search Report issued in Chinese Application No. CN201880034308.4 dated Dec. 16, 2021 (1 page).
First Office Action issued in Chinese Application No. CN201880034308.4 dated Dec. 27, 2021 with English Translation (13 pages).

* cited by examiner

DEVICE FOR TEMPORARILY INCREASING TURBOMACHINE POWER

CROSS-REFERENCE TO RELATED APPLICATION(S)

This application is the U.S. national phase entry under 35 U.S.C. § 371 of International Application No. PCT/FR2018/050747, filed on Mar. 27, 2018, which claims priority to French Patent Application No. 1752506, filed on Mar. 27, 2017.

FIELD OF THE INVENTION

The invention relates to turbine engines, and more particularly to an improved device for temporarily increasing power from a turbine engine, to a propulsion assembly including such a device, and to an aircraft fitted with such a propulsion assembly.

STATE OF THE PRIOR ART

In certain circumstances, it can be desirable to increase the power from a turbine engine temporarily. For example, while an aircraft is taking off, or in specific flying conditions, there may be a need for additional power to be delivered for a short duration. In other circumstances, with a propulsion assembly that comprises a plurality of engines, the failure of one of them may require a temporary increase in the power from one or more of the others in order to compensate for the power lost due to the failed engine.

One of the solutions known to the person skilled in the art for obtaining such a temporary increase in power is to inject a coolant fluid into the air stream upstream from the combustion chamber, which fluid may be constituted, among other possibilities, by water or by a mixture of water and antifreeze, such as methanol, ethanol, or glycol, for example. Such injection serves firstly to cool the air upstream from the combustion chamber, thereby increasing its density and thus increasing the mass flow rate of oxygen admitted into the combustion chamber. Furthermore, the coolant fluid vaporizing in the combustion chamber makes it possible to increase very significantly the pressure and/or the volume flow rate downstream from the combustion chamber, and thus to increase the mechanical work recovered in the turbine.

Such a solution is described in FR12/62433, where the coolant fluid is contained in a pressurized tank, and is injected into the turbine engine by activating one or more valves. Nevertheless, those valves can present failures that prevent the coolant fluid from being injected into the air stream upstream from the combustion chamber, thereby limiting the reliability of that solution. There thus exists a need on these lines.

SUMMARY OF THE INVENTION

An embodiment provides a device for temporarily increasing power in order to increase the power from at least one first turbine engine and from at least one second turbine engine, said device comprising:
  a tank of coolant liquid;
  a first injection circuit connected to said tank and leading to at least one injection nozzle configured to be installed upstream from the first turbine engine;
  a second injection circuit connected to said tank and leading to at least one injection nozzle configured to be installed upstream from the second turbine engine;
  each of the first and second injection circuits including at least one first valve and at least one second valve arranged upstream from said at least one first valve; and
  a bridge pipe connecting together the first injection circuit and the second injection circuit upstream from their respective first valves and downstream from their respective second valves.

In the present disclosure, the terms "upstream" and "downstream" are considered relative to the normal flow direction of gas through the injection circuits.

Whenever necessary, the device for temporarily increasing power enables the power from one of the first and second turbine engines to be increased temporarily by injecting the coolant liquid upstream from the combustion chamber of said one of the first and second turbine engines. This injection is made possible by opening the second valve, and then opening the first valve of the injection circuit by which the coolant liquid is to be injected.

The bridge pipe may be a pipe having two ends. A first end of the bridge pipe is connected to the first injection circuit downstream from its second valve and upstream from its first valve. A second end of the bridge pipe is connected to the second injection circuit downstream from its second valve and upstream from its first valve. The bridge pipe thus connects together the first and second injection circuits so that the coolant liquid can flow from the first injection circuit to the second injection circuit via said bridge pipe, and vice versa.

The bridge pipe makes it possible to mitigate a failure of the second valve to open. Specifically, when it is necessary to increase temporarily the power from one of the turbine engines, and when the second valve of the injection circuit corresponding to said turbine engine remains closed, opening the second valve of the injection circuit of the other turbine engine allows the coolant liquid to flow up to the first valve of the injection circuit corresponding to said turbine engine via the bridge pipe. The reliability of the device is thus increased, insofar as the bridge pipe ensures that one or the other of the second valves blocking does not prevent the coolant liquid from flowing to the first valve of the injection circuit corresponding to the turbine engine from which power is to be increased.

In certain embodiments, the first valves of the first and second injection circuits are configured to open when the upstream to downstream pressure difference of the first valves is greater than a predetermined value. The first valve may be a pressure valve.

Thus, by way of example, in the event of the second turbine engine failing, there is a decrease in the pressure within it, corresponding to the pressure downstream from the first valve of the first injection circuit, such that there is an increase in the upstream to downstream pressure difference of the first valve of the first injection circuit. When this pressure difference exceeds a predetermined value, the first valve of the first injection circuit opens. Furthermore, since the pressure remains constant within the first turbine engine, which has not failed, corresponding to the pressure downstream from the first valve of the second injection circuit, the upstream to downstream pressure difference of the first valve of the second injection circuit is likewise constant, and the first valve of the second injection circuit does not open. Thus, it is indeed the turbine engine which has not failed that is fed with coolant liquid, regardless of the circuit in which the coolant liquid flows.

In certain embodiments, the second valves of the first and second injection circuits are solenoid valves.

Opening of the second valves of the first and second injection circuits is thus controlled electrically. Thus, in the event of one of the two turbine engines failing, the injection circuit of the other one of the turbine engines is activated by electrically ordering the second valve of said injection circuit to open. Such electrical activation presents the advantage of being fast. Furthermore, whenever it is not desired to inject the coolant liquid into the turbine engines, the presence of the solenoid valves enables the flow of the coolant liquid to be blocked, the coolant liquid being put under pressure in the tank. Since solenoid valves are less reliable than pressure valves, using solenoid valves only in this location in the device (one solenoid valve per injection circuit), serves to optimize the reliability of the device.

In certain embodiments, the device includes a first control unit configured to order the second valve of the first injection circuit to open and to detect a failure of the second valve of the first injection circuit to open, and a second control unit configured to order the second valve of the second injection circuit to open and to detect a failure of the second valve of the second injection circuit to open.

For example, when it is found to be necessary to open the second valve of the first injection circuit, it is the first control unit that orders it to open. The coolant liquid can thus flow to the first valve of the first injection circuit. Under such circumstances, if the second valve of the first injection circuit does not open, in spite of being ordered to open by the first control unit, the first control unit detects a failure to open. Likewise, and by way of example, when it is found to be necessary to open the second valve of the second injection circuit, it is the second control unit that orders it to open. The coolant liquid can thus flow to the first valve of the second injection circuit. Under such circumstances, if the second valve of the second injection circuit does not open, in spite of being ordered to open by the second control unit, the second control unit detects a failure to open.

In certain embodiments, the first and second control units are full authority digital engine control systems of the turbine engines.

The person skilled in the art also refers to full authority digital engine control systems by the abbreviation FADEC. Using the FADEC of the turbine engine (also referred to below, unless specified to the contrary, as its "regulator system") as the control unit for controlling the device for increasing power enables this function to be integrated within a central control system, thereby improving consistency of the control with the other elements of the turbine engine and increasing the reliability of the device.

In certain embodiments, the device is configured so that, when the first control unit detects a failure of the second valve of the first injection circuit to open, the second control unit orders the second valve of the second injection circuit to open so as to allow the coolant liquid to flow towards the injection nozzle of the first injection circuit from the second injection circuit via said bridge pipe, and vice versa.

It can thus be understood that, when it is found necessary to increase temporarily the power from the first turbine engine, the first control unit orders the second valve of the first injection circuit to open. In the event of the first control unit detecting a failure of said second valve to open, the first control unit then acts via the second control unit to order the second valve of the second injection circuit to open. The coolant liquid can thus flow to the first valve of the first injection circuit via the bridge pipe.

It can also be understood that, when it is found necessary to increase temporarily the power from the second turbine engine, the second control unit orders the second valve of the second injection circuit to open. In the event of the second control unit detecting a failure of said second valve to open, the second control unit then acts via the first control unit to order the second valve of the first injection circuit to open. The coolant liquid can thus flow to the first valve of the second injection circuit via the bridge pipe.

In certain embodiments, the first and second control units are configured to communicate with each other directly or via a central unit.

Thus, the first control unit can communicate directly with the second control unit for the purpose of ordering the second valve of the second injection circuit to open. Furthermore, when the first and second control units communicate with each other via a central unit, and when one of the first and second control unit detects a failure of the second valve of one of the first and second injection circuits to open, the central unit acts via the other one of the first and second control units to order the second valve of the other one of the first and second injection circuits to open.

An embodiment also provides a propulsion assembly comprising a first turbine engine, a second turbine engine, and a device in accordance with any of the above embodiments.

An embodiment also provides an aircraft including a propulsion assembly as defined above.

An implementation provides a method of temporarily increasing power from a propulsion assembly as defined above, the method comprising the steps of:
  detecting a failure of the second valve of one of the first and second injection circuits to open; and
  ordering the second valve of the other one of the first and second injection circuits to open.

In the event of one of the two turbine engines failing, this method enables the other one of the two turbine engines to be fed with coolant liquid, even when the second valve of the injection circuit by which the coolant liquid is to be injected presents a failure to open. The reliability of the device for temporarily increasing power is thus increased.

BRIEF DESCRIPTION OF THE DRAWINGS

The invention and its advantages can be better understood on reading the following detailed description of various embodiments of the invention given as nonlimiting examples. The description makes reference to the accompanying sheets of figures, in which.

DETAILED DESCRIPTION OF EMBODIMENTS

Figure 1:
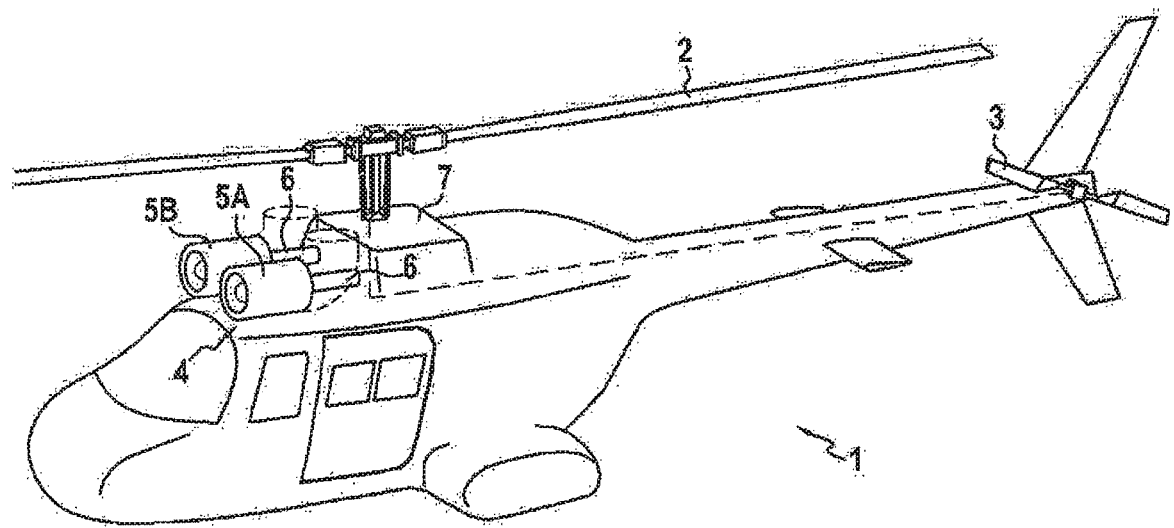
FIG. 1 is a diagram showing an aircraft including a propulsion assembly.

FIG. 1 shows a rotary wing aircraft 1, more specifically a helicopter having a main rotor 2 and an anti-torque tail rotor 3 that are coupled to a propulsion assembly 4 in order to be driven. The propulsion assembly 4 that is shown comprises two turbine engines, specifically in this example a first turboshaft engine 5A and a second turboshaft engine 5B having both of their outlet shafts 6 connected to a main gearbox 7 driving the main rotor 2 and the tail rotor 3.

Figure 2:
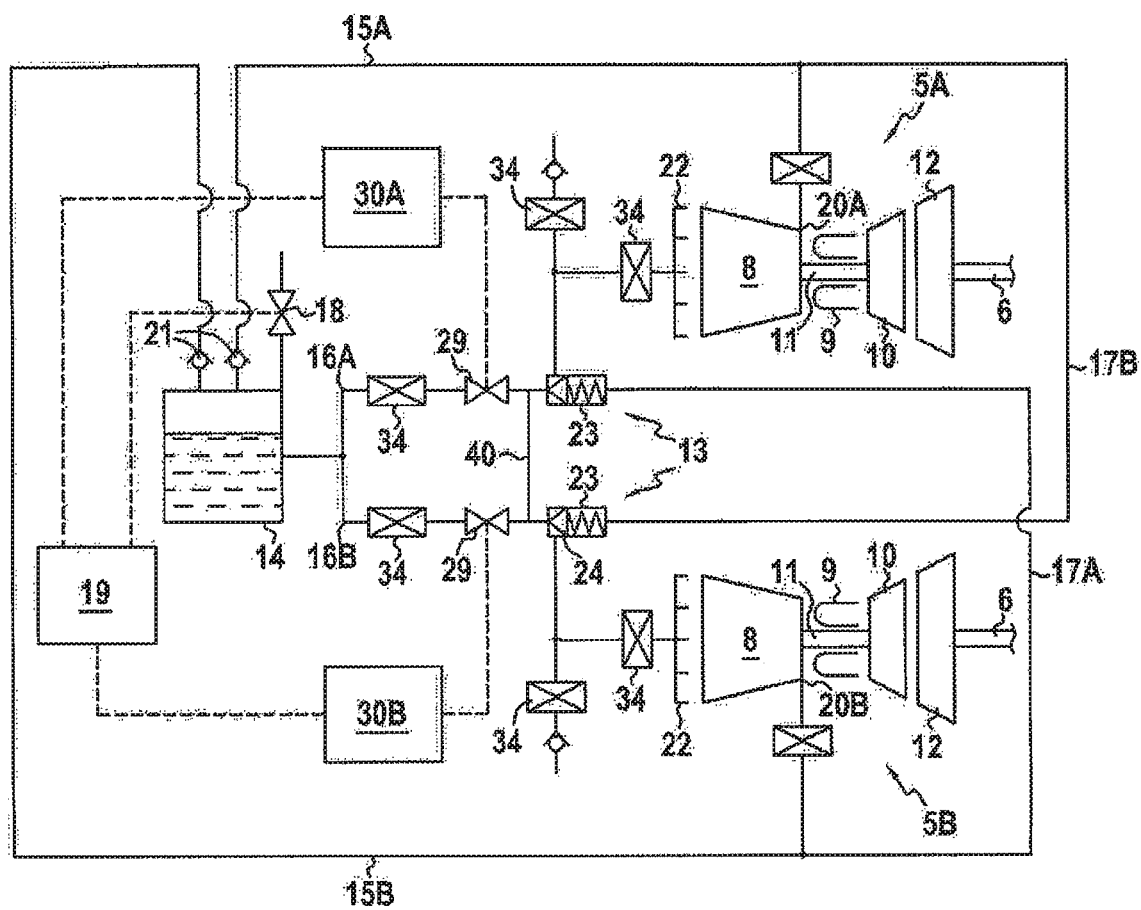
FIG. 2 is a schematic diagram of the propulsion assembly of the FIG. 1 aircraft in an embodiment.

The propulsion assembly 4 is shown diagrammatically in FIG. 2. Each turboshaft engine 5A, 5B comprises a compressor 8, a combustion chamber 9, a first turbine 10 connected by a driveshaft 11 to the compressor 8, and a second turbine 12, known as a "free" turbine, coupled to the outlet shaft 6. In order to compensate at least temporarily for a drop in power due to a failure of one of the turboshaft engines 5A or 5B, the propulsion assembly 4 is provided with a device 13 for temporarily increasing power from the other turboshaft engine 5A, 5B. The device 13 comprises a tank 14 of coolant liquid, a first pressurizing circuit 15A for pressurizing the tank 14, a second pressurizing circuit 15B for pressurizing the tank 14, a first injection circuit 16A for injecting the coolant liquid, and a second injection circuit 16B for injecting the coolant liquid. By way of example, the coolant liquid contained in the tank 14 may be water on its own, or water mixed with an antifreeze such as methanol, ethanol, and/or glycol. The tank 14 includes a depressurizing solenoid valve 18 connected to a central control unit 19 of the aircraft 1. By using this solenoid valve 18, the central control unit 19 can cause the tank to be depressurized, e.g. at the end of a flight.

The first pressurizing circuit 15A connects the tank 14 to a takeoff point 20A for taking pressurized air downstream from at least one stage of the compressor 8 of the first turboshaft engine 5A. It includes a check valve 21 oriented to allow pressurized air to flow from the compressor 8 to the tank 14, but to prevent the tank 14 from being depressurized in the opposite direction. The second pressurizing circuit 15B connects the tank 14 to a takeoff point 20B for taking pressurized air downstream from at least one stage of the compressor 8 of the second turboshaft engine 5B. It includes a check valve 21 oriented to allow pressurized air to flow from the compressor 8 to the tank 14, but to prevent the tank 14 from being depressurized in the opposite direction. By having pressurizing circuits 15A, 15B that are redundant in this way, it is possible to continue to ensure that the tank 14 is pressurized even if the turbine engine to which the other pressurizing circuit is connected has failed.

Each of the first and second injection circuits 16A, 16B is connected to the tank 14 and leads to a plurality of injection nozzles 22 installed upstream from the respective compressor 8 in each of the first and second turboshaft engines 5A and 5B. Each of these injection circuits 16A, 16B has a first valve 23 for preventing the coolant liquid from passing below a certain threshold pressure within the circuit 16A, 16B, in order to avoid any untimely leak to the injection nozzles 22 when there is no need for any temporary increase in power. Thus, in the first injection circuit 16A, the first valve 23 is caused to open by the pressure of the coolant liquid supplied by the tank 14 being greater than the compressed air supplied by the compressor 8 of the second turboshaft engine 5B, and in the second injection circuit 16B, the first valve 23 is caused to open by the pressure of the coolant liquid being greater than the compressed air supplied by the compressor 8 of the first turboshaft engine 5A.

Strainers 34 in the injection circuits 16A and 16B serve to filter any impurities that might be present in the coolant liquid.

Upstream from its first valve 23, each injection circuit 16A, 16B also includes a second valve 29 for the purpose of activating or deactivating each injection circuit 16A, 16B, which second valve may be a solenoid valve connected to a respective first or second control unit 30A or 30B. In this example, the control units 30A and 30B are respective FADECs for the turboshaft engines 5A and 5B. Thus, these control units 30A, 30B, which are also connected to the central control unit 19, can activate the corresponding injection circuits 16A, 16B by ordering the second valve 29 to open as a function of the operating parameters of each engine 5A, 5B and/or as a function of a command from a user, such as a pilot, for example, and can deactivate it once again by ordering the second valve 29 to close. The operating parameters of each engine 5A, 5B may be determined by means of pressure sensors (not shown) connected to the control units 30A, 30B and serving to detect a possible failure of one of these engines.

Thus, in the event of one of the engines 5A, 5B failing, the control unit of the other engine detects, via the central control unit 19, a situation that requires power to be increased. Thus, if the first engine 5A fails, the control unit 30B detects the need to increase the power from the engine 5B (or naturally vice versa). For example, this may consist in detecting a situation, known as a 30-second one engine inoperative (30s OEI) situation, that requires the power of one of the engines to be increased for 30 seconds in the event of the other engine failing. Under such circumstances, the second control unit 30B orders the second valve 29 of the second injection circuit 16B to open.

The device 13 comprises a bridge pipe 40. The bridge pipe 40 has a first end connected to the first injection circuit 16A downstream from the second valve 29 and upstream from the first valve 23 of the first injection circuit 16A, and a second end in fluid flow connection with the second injection circuit 16B, downstream from the second valve 29 and upstream from the first valve 23 of the second injection circuit 16B. This bridge pipe 40 enables the coolant liquid to flow from the first injection circuit to the second injection circuit, and vice versa, downstream from the second valves.

Figure 3:
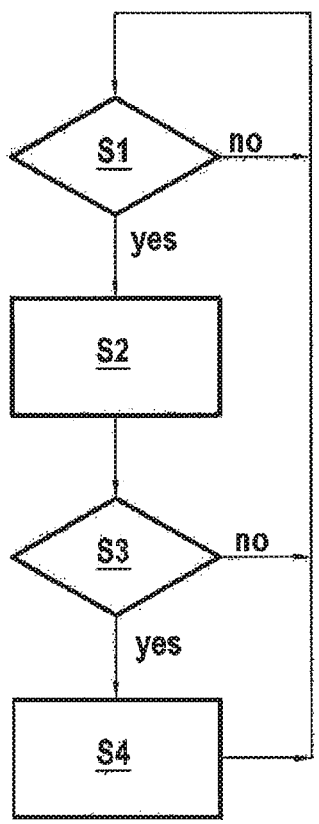
FIG. 3 shows the various steps of a method of temporarily increasing power in accordance with the present disclosure.

With reference to FIG. 3, there follows a description of a method for temporarily increasing power. A first step consists in detecting the presence of a failure of one of the engines (step S1).

If the first engine 5A has failed ("yes" in step S1), the second control unit 30B or the central unit 19 detects the need to increase power from the second engine 5B. The second valve 29 of the second injection circuit 16B is then ordered to open (step S2). Thereafter, it is detected whether the second valve 29 of the second injection circuit has indeed opened (step S3). If the second control unit 30B detects that the second valve 29 has not opened as expected ("yes" in step S3), and consequently that opening has failed, information indicating that said second valve 29 is not open is transmitted to the central unit 19. This unit then transmits this information to the first control unit 30A, which then orders the second valve 29 of the first injection circuit 16A to open (step S4). The coolant liquid can then flow to the first valve 23 of the second injection circuit 16B via the bridge pipe 40. The pressure upstream from said first valve 23, which is greater than the pressure downstream therefrom, then causes it to open, as described above. Although opening the second valve 29 of the first injection circuit 16A also allows the coolant liquid to flow to the first valve 23 of the first injection circuit 16A, that does not cause it to open, given that the pressure that exists upstream therefrom is not greater than the pressure downstream therefrom. If no engine has failed ("no" in step S1), or if no failure to open is detected ("no" in step S3), then step S1 is repeated, until a new failure is detected.

In the same manner, if the second engine 5B fails ("yes" in step S1), the first control unit 30A detects the need to increase the power of the first engine 5A and orders the second valve 29 of the first injection circuit 16A to open (step S2). Nevertheless, if the first control unit 30A detects that the second valve 29 has not opened as expected ("yes" in step S3), information indicating that said second valve 29 is not open is transmitted to the central unit 19. This unit then transmits this information to the second control unit 30B, which then orders the second valve 29 of the second injection circuit 16B to open (step S4). The coolant liquid can then flow to the first valve 23 of the first injection circuit 16A via the bridge pipe 40.

Such a solution serves to improve significantly the reliability of the device for temporarily increasing power. Specifically, the probability of a configuration in which both solenoid valves of the device are blocked in the closed position is much lower than the probability of one of those valves being blocked in the closed position.

Although the present invention is described with reference to specific embodiments, it is clear that modifications and changes may be made to those embodiments without going beyond the general ambit of the invention as defined by the claims. In particular, individual characteristics of the various embodiments shown and/or mentioned may be combined in additional embodiments. Consequently, the description and the drawings should be considered as being illustrative rather than restrictive.

It is also clear that all of the characteristics described with reference to a method can be transposed, singly or in combination, to a device, and vice versa, all of the characteristics described with reference to a device can be transposed, singly or in combination, to a method.

The invention claimed is:

1. A device for temporarily increasing power in order to increase the power from at least one first turbine engine and from at least one second turbine engine, said device comprising:
   a tank of coolant liquid;
   a first injection circuit connected to said tank and leading to at least one injection nozzle configured to be installed upstream from the first turbine engine;
   a second injection circuit connected to said tank and leading to at least one injection nozzle configured to be installed upstream from the second turbine engine;
   each of the first and second injection circuits including at least one first valve and at least one second valve arranged upstream from said at least one first valve; and
   a bridge pipe connecting together the first injection circuit and the second injection circuit upstream from their respective first valves and downstream from their respective second valves, so that the coolant liquid can flow from the first injection circuit to the second injection circuit via said bridge pipe, and vice versa.

2. A device for temporarily increasing power according to claim 1, wherein the first valves of the first and second injection circuits are configured to open when the upstream to downstream pressure difference of the first valves is greater than a predetermined value.

3. A device for temporarily increasing power according to claim 1, wherein the second valves of the first and second injection circuits are solenoid valves.

4. A device for temporarily increasing power according to claim 1, including a first control unit configured to control the opening of the second valve of the first injection circuit and to detect a failure of the second valve of the first injection circuit to open, and a second control unit configured to control the opening of the second valve of the second injection circuit and to detect a failure of the second valve of the second injection circuit to open.

5. A device for temporarily increasing power according to claim 4, wherein the first and second control units are full authority digital engine control systems of the turbine engines.

6. A device for temporarily increasing power according to claim 4, configured so that, when the first control unit detects a failure of the second valve of the first injection circuit to open, the second control unit orders the second valve of the second injection circuit to open so as to allow the coolant liquid to flow towards the injection nozzle of the first injection circuit from the second injection circuit via said bridge pipe, and vice versa.

7. A device for temporarily increasing power according to claim 4, wherein the first and second control units are configured to communicate with each other directly or via a central unit.

8. A propulsion assembly comprising a first turbine engine, a second turbine engine, and a device for temporarily increasing power according to claim 1.

9. An aircraft including a propulsion assembly according to claim 8.

10. A method of temporarily increasing power from a propulsion assembly according to claim 8, the method comprising the steps of:
    detecting a failure of the second valve of one of the first and second injection circuits to open; and
    opening the second valve of the other one of the first and second injection circuits.

* * * * *